UNITED STATES PATENT OFFICE 2,314,994

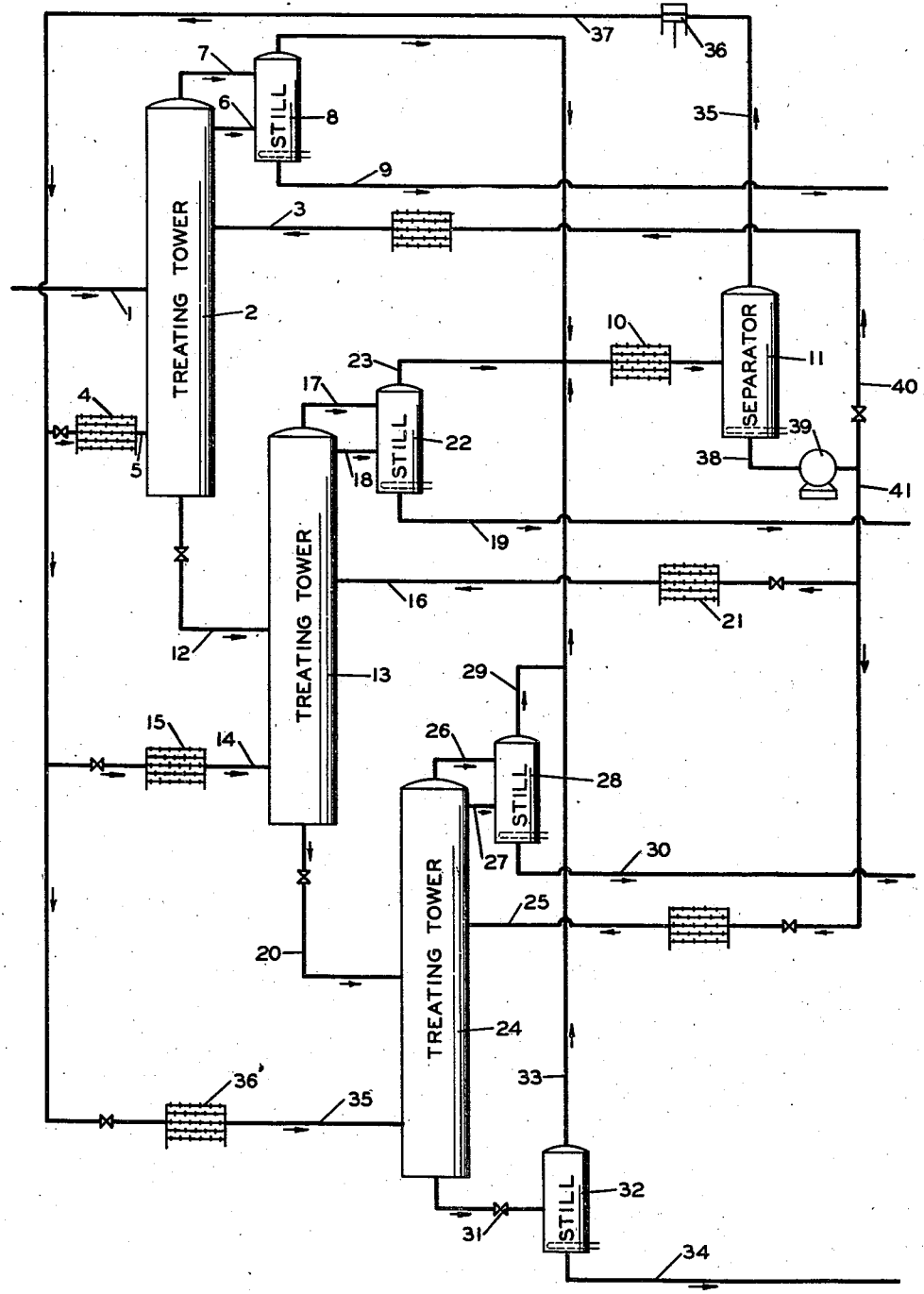

PROCESS FOR DEWAXING LUBRICANT STOCKS

Shelby D. Lawson, Borger, Tex., and Robert W. Henry, Bartlesville, Okla., assignors to Phillips Petroleum Company, a corporation of Delaware Application June 1, 1940, Serial No. 338,400

2 Claims. (Cl. 196—18)

This invention relates to an improved process for dewaxing of mineral or other oils. More specifically, it relates to a process of solvent dewaxing of mineral oils and deoiling of the wax in which the principle of "gas flotation" is used.

It is well known that solidified wax may be separated from an oil solution in a suitable solvent by cold settling, centrifuging, filtration, electrical precipitation, etc. But, the wax so separated contains adhering oil which reduces the yield of dewaxed oil as well as lowering the quality of the removed wax, unless the wax contaminated with oil is subjected to exhaustive washing or sweating in separate steps, or is dissolved with additional solvent, recrystallized by chilling the solution, and centrifuged, filtered or cold settled a second time.

In an attempt to wash the precipitated wax free of oil the principle of countercurrent flow was utilized in which precipitated wax, and chilled solvent and solvent-oil solutions were made to flow in opposite directions in a dewaxing and washing tower. In case a specifically light solvent is used, that is, one which has a lower specific gravity than the separated wax, the precipitated wax crystals settle downward and against an upward flowing current of solvent. When the dewaxing solvent has a higher specific gravity than the separated wax, the latter tends to rise in the dewaxing apparatus and against a downward flowing current of said heavy dewaxing solvent. In these cases the oil which remains in solution in the respective solvent decreases the differential in specific gravity between the wax and the solvent. Hence, in a low specific gravity solvent, the precipitated wax settles less rapidly in the solvent-oil solution than in the solvent alone, and in a high specific gravity solvent, the precipitated wax rises less rapidly in the solvent-oil solution than in the solvent alone. In both cases, that is, the wax settling downward or upward, the rate of travel is slow, and wax-removal operations are slow and plant capacities are accordingly small.

In a co-pending application, Serial No. 334,292 filed May 9, 1940, by Robert W. Henry, James V. Montgomery and Shelby D. Lawson, these inventors described means of increasing the relative density of the precipitated wax, thereby increasing the specific gravity differential between the solvent-oil solution and the precipitated wax. This weighting of the precipitated wax greatly facilitates wax settling and separation and thereby increases dewaxing plant capacities.

We have found in solvent dewaxing that wax removal may be improved by employing the principle of "gas flotation," wherein a particle of wax or waxy material is rendered lighter in apparent specific gravity by causing gas bubbles to be occluded to said wax at essentially atmospheric pressure. The specific gravity differential between the gas-wax combinations and the oil-solvent solution is thereby increased, wherein the wax rises to the surface of the solvent-oil solution much more rapidly than if a gas were not occluded by the wax.

In our process which utilizes this "gas flotation" principle, wax from the solution of oil and wax in solvent occludes bubbles of cold gas and these combinations consisting of gas bubbles and wax are washed by a downward flowing stream of fresh solvent. Occlusion of the gas bubbles in wax is in accordance with the known tendency of wax to precipitate upon a cold surface and is accomplished by maintaining a temperature differential between the wax-solvent solution and the gas, the gas having the lower temperature. The process may be accomplished in one stage, but we prefer a multiple stage process, as three or more stages, and in this manner we can produce oils of 0° F. cold test, or lower. The wax is collected separately from each stage and as a result of the multi-stage process it is fractionally precipitated as high, intermediate, and low melting point waxes and separated as such.

The process is not limited to any particular dewaxing solvent of high specific gravity but is applicable to the entire range of dewaxing solvents as known to the art, such as, light naphthas, gasoline, heavy naphthas, or their derivatives, acetone-benzol, ethylene dichloride, picolines, mixtures of selective solvents with miscibility enhancers, etc., the principal requirements being that the solvent be completely miscible with oil and wax at temperatures of approximately 100–120° F., and be completely miscible with the oil at the dewaxing temperature with but little solubility for wax at the dewaxing temperature and be liquid at normal atmospheric temperatures under essentially atmospheric pressures. The process does not depend upon the specific gravity of the solvent since the wax-gas combinations are of lower specific gravity than any of the dewaxing solvents available.

The gas may be any gas which is relatively inert, such as, hydrogen, methane, ethane, nitrogen, carbon dioxide, ammonia, propane, etc., and may or may not be a refrigerating gas.

By the terms "paraffin" and "wax" the applicants intend to include that wax-like, nonasphaltic material which separates from the crude or other mineral oils by cooling. The drawing shows the treating zone in the form of towers and it is so described herein, but it will be obvious that the applicants' process does not depend upon any particular form of apparatus.

It is, therefore, an object of our invention to separate paraffin and other waxy materials from paraffin oils.

Another object of our invention is to effect a sharp separation of waxy materials from paraffinic oils.

Still a further object is to treat mineral oil containing paraffinic components with a solvent in a treating zone to separate the paraffinic material from the oil with the aid of refrigeration and "gas flotation" and countercurrent washing of the occluded oil from the precipitated wax-gas aggregates and refluxing of the more waxy portion of the oil.

Other objects and advantages of our invention will be apparent from the following description, taken in conjunction with the drawing which illustrates a diagrammatic form of apparatus for successfully practicing our invention.

*Example*

The drawing is a diagrammatical view of a dewaxing system embodying features of this invention. As an example of our preferred process, reference is made to the figure in which waxy oil dissolved in a dewaxing solvent at a temperature of 100° F. or higher, is introduced through line 1 into tower 2 where it comes in contact with a downward flowing chilled solvent which is introduced near the top of tower 2 through line 3. In a 3-stage system, such as herein described, gas at about 60° F. is introduced near the bottom of tower 2 through chiller 4 and line 5. Wax precipitates out upon the upward flowing gas bubbles and is washed by the downward stream of fresh solvent. The washed wax-gas particles near the top of the tower are removed therefrom through line 6 and are discharged into still 8. Any gas which becomes freed of wax is removed from the top of tower 2 through line 7 and is transferred into still 8, in which gas and solvent are removed from wax. The wax is removed from still 8 through line 9 and passes to high melting point wax storage, not shown. The gas and solvent vapors from the top of still 8 pass through cooler 10 into separator 11. The solvent with dissolved oil and remaining dissolved wax is removed from the bottom of tower 2 through line 12, the temperature of said solution now being approximately 60° F. as a result of heat exchange with the cold gas introduced into said tower 2 through line 5.

The process as above described is repeated in tower 13, except that the temperature of the charge oil-wax-solvent solution is approximately 60° F. and the temperature of the gas from line 14 has been chilled to approximately 20° F. by chiller 15. Chilled solvent is led into this tower through line 16 after having been chilled in chiller 21. Unoccluded gas is removed from tower 13 through line 17, the gas-wax product is removed through line 18 and both gas-wax and gas are conducted into still 22 from the bottom of which intermediate melting point wax is removed and transferred through line 19 to the corresponding wax storage, not shown. Gas and solvent vapors leave top of said still through line 23 and join the gas-solvent vapors from still 8 in cooler 10. The solvent with dissolved oil and remaining dissolved or unprecipitated wax is transferred from dewaxing tower 13 at a temperature of approximately 20° F., through line 20 into dewaxing tower 24 in which the wax precipitation process is again repeated except that the gas through line 25 from chiller 36' is introduced into the tower 24 at a temperature of approximately —20° F. The wax precipitates out upon this —20° F. gas at essentially atmospheric pressure and the wax-gas particles rise to the top of the tower 24 against a descending current of chilled solvent. The accumulated gas from said tower is removed through line 26 into still 28. The wax in suspension in solvent is transferred from said tower through line 27 into still 28, from the bottom of which low melting point wax is transferred through line 30 to its wax storage, not shown. The gas and solvent vapors leave the top of still 28 through line 29 and join vapors and gas from stills 22 and 8 in cooler 10. The solvent with dissolved oil, which has been substantially freed of wax, is removed through line 31 into still 32, in which solvent and dissolved gas are removed from the low cold test oil. The oil passes through line 34 to wax-free oil storage, not shown, while the gas and solvent vapors leave through line 33 and join the gas and solvent vapors from the aforementioned stills in cooler 10. The combined gas-solvent vapors are cooled in cooler 10, and the gas separated from liquid solvent in separator 11, from which the gas exits through line 35, is compressed in compressor 36 and passes through manifold line 37 for recycling into the several dewaxing towers. The accumulated solvent discharges from said separator through line 38, pump 39 and lines 40 and 41 to recycle into the several dewaxers. While a method of separating waxes and low cold test oil from the gas and solvent was described, it is obvious that these materials may be separated by conventional methods.

In this process, an effect analogous to rectification is obtained by alternate solidification and partial melting and solution due to temperature differentials in the dewaxing towers. Minute wax crystals form on bubbles of cold gas near the bottom of the towers, and these aggregates rise in their respective towers. As they rise, they contact progressively warmer solvent solution and the oily lower melting point wax melts or dissolves off the waxy particles, leaving a residue of relatively high melting point wax, and gas. As these higher melting point wax-gas particles travel up the tower a portion of this wax is dissolved therefrom, increasing the gas to wax ratio. The gas-wax globules which finally reach the top of the tower comprise only the highest melting point wax which can remain in equilibrium with the solvent at a given temperature. This process of wax precipitation and redissolving of the lower melting point portion as the wax progresses up the tower, results in a rectification of the solidified wax to separate the more oily material from the harder more nearly oil-free wax.

The oily wax portions which are dissolved by the solvent in the upper portions of the towers, pass downward with the flow of solvent and are reprecipitated upon newly added chilled gas, this operation resulting in a refluxing of the more waxy portion of the oil.

This combined dissolving of the lower melting point oily wax in the upper portion of the tower and the reprecipitation of the more waxy portion thereof in the lower portion of the tower results in a combined refluxing and rectification, which tends to give a nearer wax-free oil and nearer oil-free wax.

In the above application, it is advantageous to so chill the waxy oil-solvent mixture and the recycle solvent that the temperature gradient through a given dewaxing tower will be small so that the wax crystals which form on the bubbles of gas will be very small, since small wax crystals contain a minimum of occluded oil and will be easier to wash free of said contaminating oil and of contaminating lower melting point oily wax.

It is obvious that this process can be applied in a single dewaxing tower, or as hereinbefore described in successive stages and an increasingly lower melting point wax and lower pourpoint oil being taken from successive stages.

The relative positions at which the several charge lines 1, 12 and 20 enter the several dewaxing towers, 2, 13 and 24, respectively, are selected from optimum operation, and may be at or near the point at which the composition of the combined oil and precipitated wax in the tower has characteristics similar to those of the entering oil.

It is to be understood that the above is merely illustrative of the principles and preferred embodiment of our improved invention of which many variations may be made by those skilled in the art without departing from the spirit of this invention.

We claim:

1. The continuous process of dewaxing mineral oils including the steps of mixing the waxy oil with a dewaxing solvent at such a temperature as to have complete solution between the waxy oil and solvent, adding cooled, finely divided bubbles of inert gas to the waxy oil-solvent mixture in a first dewaxing zone to cool the mixture and to precipitate at least a portion of the wax thereon, removing these first wax-gas agglomerates; passing the partially dewaxed oil-solvent mixture of the first dewaxing zone into a second dewaxing zone, adding chilled, finely divided bubbles of inert gas to chill the mixture of partially dewaxed oil and solvent and to precipitate an additional portion of the wax thereon and removing these second wax-gas agglomerates; and passing the partially dewaxed oil-solvent mixture of the second dewaxing zone into a third dewaxing zone, adding chilled finely divided bubbles of inert gas to chill to a still lower temperature the mixture of partially dewaxed oil and solvent and to precipitate a third fraction of the wax thereon and removing these third wax-gas agglomerates and the dewaxed oil-solvent mixture from the third dewaxing zone; separating the gas from the first, second and third wax-gas agglomerates, and separating the solvent from the dewaxed oil, and recycling the inert gas and the separated solvent.

2. The continuous process of dewaxing mineral oils including the steps of mixing the waxy oil with a dewaxing solvent at such a temperature as to have complete solution between the waxy oil and solvent, adding cooled, finely divided bubbles of inert gas to the waxy oil-solvent mixture in a first dewaxing zone to cool the mixture and to precipitate at least a portion of the wax thereon, washing these first wax-gas agglomerates with cooled solvent in the first dewaxing zone and removing the washed wax-gas agglomerates; passing the partially dewaxed oil-solvent mixture of the first dewaxing zone into a second dewaxing zone, adding chilled, finely divided bubbles of inert gas to chill the mixture of partially dewaxed oil and solvent to precipitate a second portion of the wax thereon, and washing these second wax-gas agglomerates with chilled solvent in the second dewaxing zone and removing the washed, second wax-gas agglomerates; passing the partially dewaxed oil-solvent mixture of the second dewaxing zone into a third dewaxing zone, adding further chilled, finely divided bubbles of inert gas to chill further the mixture of partially dewaxed oil and solvent to precipitate a third portion of the wax thereon, and washing these third wax-gas agglomerates with further chilled solvent in the third dewaxing zone and removing the washed, third wax-gas agglomerates and the dewaxed oil-solvent mixture from the third dewaxing zone; separating the gas from the first, second and third wax-gas agglomerates, and separating the solvent from the dewaxed oil, and recycling the inert gas and the separated solvent.

SHELBY D. LAWSON.
ROBERT W. HENRY.